March 5, 1940.   O. B. MACK   2,192,233
GRAINING MACHINE
Filed May 6, 1939   2 Sheets-Sheet 1
Fig. 1
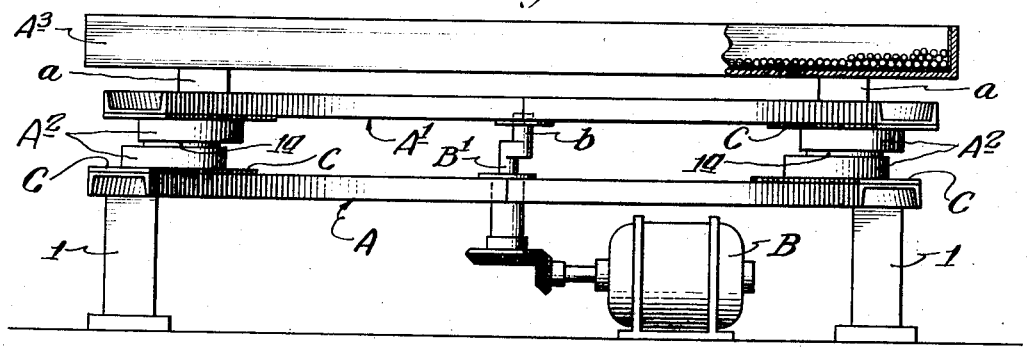
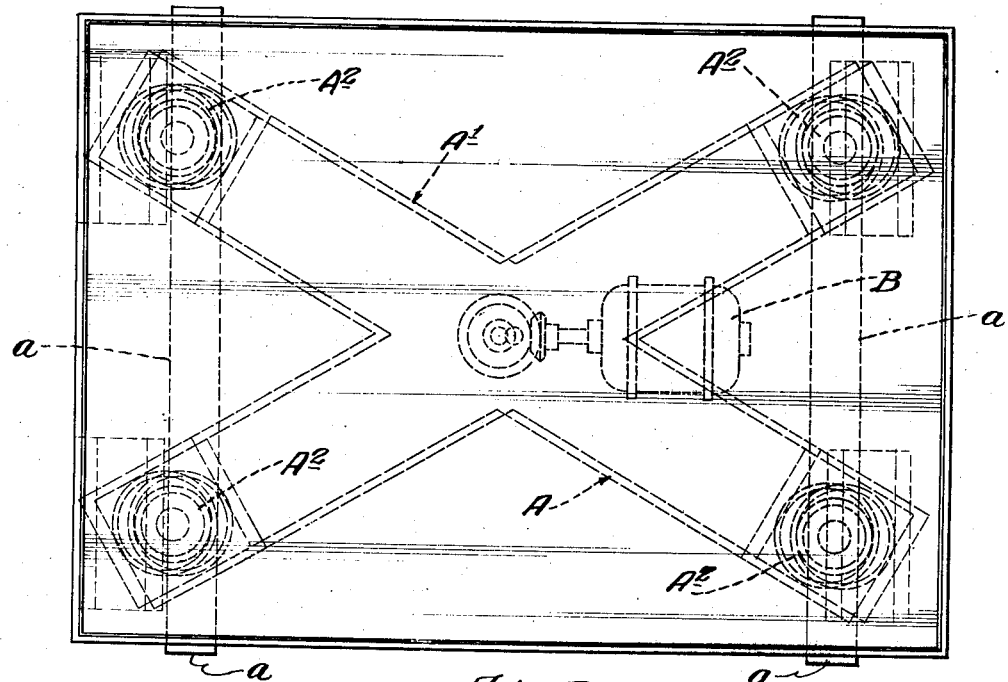
Fig. 2
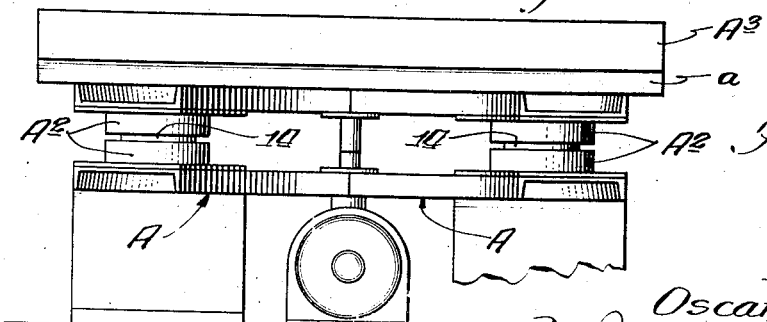
Fig. 3
Inventor:
Oscar B. Mack.
By: [signature]
Attorney.

March 5, 1940.  O. B. MACK  2,192,233
GRAINING MACHINE
Filed May 6, 1939  2 Sheets-Sheet 2
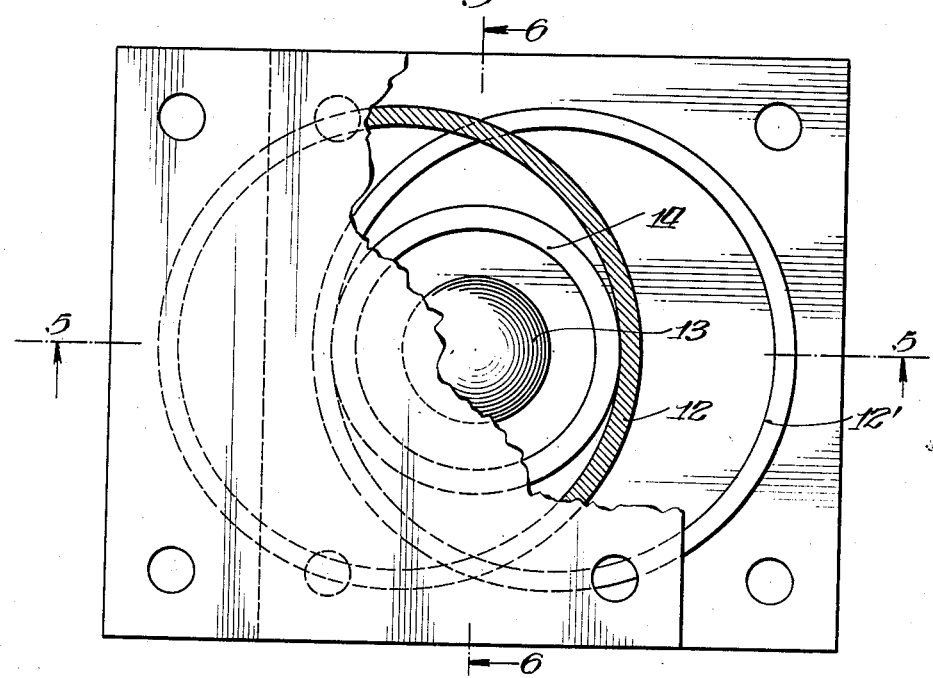
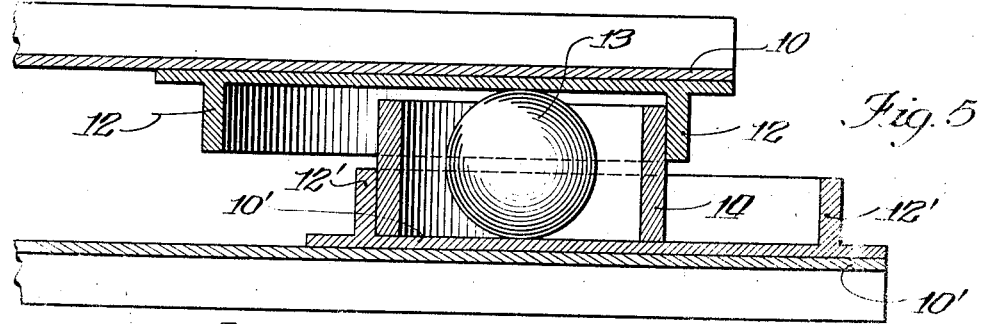
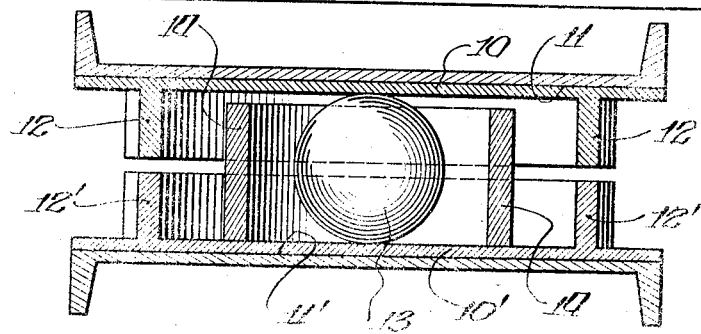
Inventor:
Oscar B. Mack
By G. J. E. Waldo,
Attorney Patented Mar. 5, 1940

2,192,233

UNITED STATES PATENT OFFICE 2,192,233

GRAINING MACHINE

Oscar B. Mack, Chicago, Ill.

Application May 6, 1939, Serial No. 272,201

3 Claims. (Cl. 51—6)

This invention relates to machines or apparatus for graining zinc, aluminum or other plates of suitable material, to prepare them for use in various lithographic processes, said machines being of the general type comprising a supporting base, a pan mounted thereon to the inner side of the bottom of which the plates to be grained are secured by suitable means, as clamps, graining of said plates being effected by the combined abrading action of balls, silica or other sand suitable for the purpose, and water, all deposited in said pan, to which rapid vibration in a horizontal plane is then imparted, preferably with a circular motion and on a short radius, such vibration being continued until a desired grain is imparted to the sides of the plates exposed in said pan in a usual manner and as will readily be understood by operators familiar with such processes.

Objects of the invention are:

1. To provide a frame for supporting the pan, forming part of the apparatus, which is simple in construction, strong, durable, highly effective in operation, and the constituent elements of which are readily accessible for purposes of inspection, repair, replacement and lubrication.

2. To provide anti-friction bearings of new and novel construction for operatively mounting the pan in which graining of the plates in process is effected, which has great freedom of movement, is substantially self-centering, which practically eliminates friction in the bearings, and operates on a minimum of power.

Other objects of the invention will appear hereinafter.

In the accompanying drawings, in which the invention is fully illustrated:

Fig. 1 is a front view, partly in section, of a machine or apparatus embodying my invention and improvements;

Fig. 2 is a top plan view thereof, showing the pan in which the plates to be grained or processed, are contained, in full lines, and the frame for operatively mounting said machine, in dotted lines;

Fig. 3 is a view from the right side of Fig. 1;

Fig. 4 is a detached top plan view on an enlarged scale, of one of the bearings for operatively mounting the processing pan of the apparatus on the base of the machine, partly broken away and partly in section;

Fig. 5 is a sectional view on the line 5—5 of Fig. 4; and

Fig. 6 is a view on the line 6—6 of Fig. 4.

Describing the invention with reference to the drawings, the operative parts of the machine are mounted on a fixed supporting frame or base, comprising what may be designated an X-frame A, best shown in Fig. 2, the ends of which are supported on fixed posts 1, said X-frame as shown being fabricated from suitable structural shapes, preferably steel channel beams, disposed with their channels facing downwards.

In accordance with the invention also, and as clearly shown in Fig. 1, a second X-frame A', substantially similar to the X-frame A, but with its channel side facing upwards, is mounted on and supported by the fixed channel beam A, the means for thus mounting said channel beam A', consisting of anti-friction bearings $A^2$, mounted at the ends of said X-frames.

What I now consider preferable bearings for the purpose are shown in detail in Figs. 4 to 6 of the drawings, all of said bearings being similar in construction one to another, as near as may be.

Describing my improved bearings with reference to the drawings, 10, 10', designate flat plates of hard material, preferably hardened steel, secured to opposed, rigidly supported, parallel surfaces 11, 11', formed on which respectively, are recessed circular flanges 12, 12', which form open-sided cups, the bottoms of which are substantially flat and parallel and interposed between said plates are balls 13, the diameters of which are greater than the combined axial dimension of the flanges 12, 12', thus preventing contact of the ends of said flanges with each other in operation. Also in accordance with the invention, and as shown, the balls 13 are positioned inside of rings 14, also preferably made of hardened steel, and the axial dimension of which is less than the diameter of the balls 13, and which co-operates with the flanges 12, 12' of the bearings, to maintain said balls in approximately central positions in the bearings, as best shown in Fig. 4.

Due to the fact that the diameter of the balls 13 is greater than the combined axial dimension of both bearing-ring flanges 12—12', it is obvious that both the balls 13 and rings 14 will be free to move in their bearings, the balls 13 with a rolling motion, and the rings 14 with a sliding motion on their lower ends, along the surface of the plate 10', movement of said balls and rings sufficient to disengage the members of the bearings, being prevented by contact of overlapping parts of said bearing members, as contact of the upper ends of the rings 14 with the depending upper flanges 12, or contact of the lower ends of said rings with the flanges 12', all as clearly shown in Figs. 5 and 6 of the drawings, and as will be readily understood from the drawings.

In accordance with the invention also, the graining or processing pan, designated as a whole A³, and which may be of usual, or any desired construction, is operatively mounted on the upper X-frame A¹, by means of wood or other suitable beams $a$, securely fastened to said X-frame, and to which said pan is bolted or otherwise firmly secured.

As shown in the drawings, see Fig. 1, a wall of the pan is broken away in part, to disclose the contents and interior structure thereof.

In operation, rapid vibration in a horizontal plane and on a short radius, is imparted to the X-frame A¹, and the processing pan A³, supported thereon, whereby the plates in process are subjected to an abrading action, which will impart more or less of a grain to the surface of the plates exposed in the pan, depending on the length of time they are subjected to the graining operation.

What I now consider preferable means for imparting desired rapid vibratory motion to said X-frame A¹, and processing pan A³, consists of an electric motor B, which is geared to a crank shaft B', having a bearing in the fixed X-frame A, and an eccentric extension $b$, which has an elongated bearing in the movably mounted X-frame A'.

While I have shown and described what I consider preferred means for carrying my invention into effect, these are capable of variation and modification without departing from the spirit of the invention. I therefore do not wish to be limited to the exact details of construction shown, but desire to avail myself of such variations and modifications as come within the scope and contemplation of the appended claims.

I claim:

1. In plate graining apparatus, in combination, a supporting base, frame members mounted thereon, comprising a relatively fixed member, a second member superposed thereon with capacity to move freely, flanges on the proximate sides of said members, which form ball pockets, balls in said pockets, the diameters of which exceed the combined axial dimensions of said flanges, and rings positioned in said ball pockets, surrounding the balls therein, respectively, the interior radial dimensions of which exceed the diameters of said balls, providing clearance which prevents binding of the balls in said rings.

2. The apparatus specified in claim 1, in which the axial dimensions of the bearing flanges are less than the diameters of the balls, thereby permitting both said rings and balls to move freely in their bearings.

3. The apparatus specified in claim 1, in which the axial dimensions of the rings are so proportioned that their opposite ends will overlap the flanges on different bearing members, forming stops which limit movement of said members, and prevent disengagement thereof.

OSCAR B. MACK.